US012538884B2

(12) United States Patent
van Dorp et al.

(10) Patent No.: US 12,538,884 B2
(45) Date of Patent: Feb. 3, 2026

(54) **PLANTS OF THE SPECIES *BETA VULGARIS* WITH RESISTANCE TO *CERCOSPORA***

(71) Applicant: Bejo Zaden B.V., Warmenhuizen (NL)

(72) Inventors: Jacob van Dorp, Warmenhuizen (NL); Rosaline Anna Maria Jong, Warmenhuizen (NL); Dora Lisa Moita E Coelho, Warmenhuizen (NL); Albertus Johannes Maria Schrijver, Warmenhuizen (NL)

(73) Assignee: Bejo Zaden B.V., Warmenhuizen (NL)

( * ) Notice: Subject to any disclaimer, the term of this patent is extended or adjusted under 35 U.S.C. 154(b) by 159 days.

(21) Appl. No.: 18/563,957

(22) PCT Filed: May 28, 2021

(86) PCT No.: PCT/EP2021/064365
§ 371 (c)(1),
(2) Date: Nov. 24, 2023

(87) PCT Pub. No.: WO2022/248060
PCT Pub. Date: Dec. 1, 2022

(65) Prior Publication Data
US 2024/0251730 A1    Aug. 1, 2024

(51) Int. Cl.
*A01H 6/02*    (2018.01)
*A01H 1/00*    (2006.01)
*A01H 5/06*    (2018.01)
*C12Q 1/6895*    (2018.01)

(52) U.S. Cl.
CPC ............ *A01H 1/1255* (2021.01); *A01H 5/06* (2013.01); *A01H 6/024* (2018.05); *C12Q 1/6895* (2013.01)

(58) Field of Classification Search
None
See application file for complete search history.

(56) References Cited

FOREIGN PATENT DOCUMENTS

EP    3696188 A1 *    8/2020    ......... C12N 15/8213

OTHER PUBLICATIONS

Setiawan et al. (TAG, 100:1176-1182, Published Jun. 30, 2020).*
Ensembl: "Results for BLASTN against Beta vulgaris RefBeet-1.2.2 (Genomic sequence)", Jan. 1, 2022, XP055885757, IDS.*
Dohm et al. (Gen Bank Accession No. HN134762, pp. 1-2; Published Jul. 10, 2013).*
"Results for BLASTN against Beta vulgaris RefBeet-1.2.2 (Genomic sequence)", https:/plants.ensembl.org/Beta_vulgaris, 12 pages.
Setiawan et al., "Mapping quantitative trait loci (QTLs) for resistance to Cercospora leaf spot disease (*Cercospora beticola* Sacc.) in sugar beet (*Beta vulgaris* L.)," Theoretical and Applied Genetics, 2000, pp. 1176-1182, vol. 100.
Sakata Seed America, Inc. 2019 Beet Brochure, published Jul. 2, 2019, evidence of publication can be found at https://web.archive.org/web/20200930054753/https://sakatavegetables.com/wp-content/uploads/2017/07/SakataBeetAdvantageBrochure-1.pdf.†

* cited by examiner
† cited by third party

*Primary Examiner* — Vinod Kumar
(74) *Attorney, Agent, or Firm* — The Webb Law Firm

(57) ABSTRACT

Provided herein are *Beta vulgaris* plants resistant to *Cercospora*. Also provided herein are methods for identifying *Cercospora* resistant *Beta vulgaris* plants, methods for providing *Cercospora* resistant *Beta vulgaris* plants and means for identifying *Cercospora* resistant *Beta vulgaris* plants. Specifically, provided herein are *Cercospora*-resistant *Beta vulgaris* plants including a first *Cercospora* resistance providing genomic fragment on chromosome 4, wherein said first *Cercospora* resistance providing genomic fragment includes at least one sequence from the group consisting of SEQ ID Nos. 1, 3, 5, 7, 9, 11, 13, and 15.

5 Claims, No Drawings

Specification includes a Sequence Listing.

SEQUENCE LISTING

<160> NUMBER OF SEQ ID NOS: 38

<210> SEQ ID NO 1
<211> LENGTH: 201
<212> TYPE: DNA
<213> ORGANISM: Beta vulgaris

<400> SEQUENCE: 1

```
acacarggga cgaaaagcag aacakgacac caacacarta gcaataacga cacaacaaga      60
gcagcaacat aacaacaatt caatgaccca ctaacaataa accaccacam ctccttttag     120
ctaaactcac aatcactaat caatctgcta attcaaatct tgaartgaaa taaaatcyat     180
ttctragtaa actcagcaaa c                                               201
```

<210> SEQ ID NO 2
<211> LENGTH: 201
<212> TYPE: DNA
<213> ORGANISM: Beta vulgaris

<400> SEQUENCE: 2

```
acacarggga cgaaaagcag aacakgacac caacacarta gcaataacga cacaacaaga      60
gcagcaacat aacaacaatt caatgaccca ctaacaataa gccaccacam ctccttttag     120
ctaaactcac aatcactaat caatctgcta attcaaatct tgaartgaaa taaaatcyat     180
ttctragtaa actcagcaaa c                                               201
```

<210> SEQ ID NO 3
<211> LENGTH: 201
<212> TYPE: DNA
<213> ORGANISM: Beta vulgaris

<400> SEQUENCE: 3

```
tactcaagca cgtaaatggt tcaacgaaat ggttctggat ggctgttccc ctaatgtggt      60
gacctacact gccctaattc atgcatacct taaagtacgc tggataggtg aagccaatga     120 acttttgag attatgttga aagatggatg caaaccgaat gttgtgactt atactgcttt     180
aattgatggt tattgtaaat c                                               201
```

<210> SEQ ID NO 4
<211> LENGTH: 201
<212> TYPE: DNA
<213> ORGANISM: Beta vulgaris

<400> SEQUENCE: 4

```
tactcaagca cgtaaatggt tcaacgaaat ggttctggat ggctgttccc ctaatgtggt      60
gacctacact gccctaattc atgcatacct taaagtacgc aggataggtg aagccaatga     120
``` acttttttgag attatgttga aagatggatg caaaccgaat gttgtgactt atactgcttt    180
aattgatggt tattgtaaat c                                              201

<210> SEQ ID NO 5
<211> LENGTH: 201
<212> TYPE: DNA
<213> ORGANISM: Beta vulgaris

<400> SEQUENCE: 5
gagctgatcc ggtttgtttc aaaccataag cctattgttg ctgctatgag ggtgtctgag    60
agaactgtca tgattatcaa gaacctagta tcgtcttcgg tgccatctct ggtatggtag    120
tattgacata tagaaaatgc caattttttca gttcttggtc atattcactt aaggacagta   180
tgcttgtaca gtcttctcta t                                              201

<210> SEQ ID NO 6
<211> LENGTH: 201
<212> TYPE: DNA
<213> ORGANISM: Beta vulgaris

<400> SEQUENCE: 6
gagctgatcc ggtttgtttc aaaccataag cctattgttg ctgctatgag ggtgtctgag    60
agaactgtca tgattatcaa gaacctagta tcgtcttcgg cgccatctct ggtatggtag    120
tattgacata tagaaaatgc caattttttca gttcttggtc atattcactt aaggacagta   180
tgcttgtaca gtcttctcta t                                              201

<210> SEQ ID NO 7
<211> LENGTH: 201
<212> TYPE: DNA
<213> ORGANISM: Beta vulgaris

<400> SEQUENCE: 7
caaagtaaga agtcagaaaa tttatattcc tagcctctct tcctcacccc ttttcctgta    60
tgttgtgtga gctttgatta gttttaacga atataattct ttcgctgcaa acctgcaagt   120
gtgtatatac tccattttgt atatatatga aatcatggag tattgcagtg aggaatcttt   180
gtaagacttt ctctgagaat g                                              201

<210> SEQ ID NO 8
<211> LENGTH: 201
<212> TYPE: DNA
<213> ORGANISM: Beta vulgaris

<400> SEQUENCE: 8
caaagtaaga agtcagaaaa tttatattcc tagcctctct tcctcacccc ttttcctgta    60
tgttgtgtga gctttgatta gttttaacga atataattct gtcgctgcaa acctgcaagt   120
gtgtatatac tccattttgt atatatatga aatcatggag tattgcagtg aggaatcttt   180
gtaagacttt ctctgagaat g                                              201

<210> SEQ ID NO 9
<211> LENGTH: 201
<212> TYPE: DNA
<213> ORGANISM: Beta vulgaris

<400> SEQUENCE: 9
tttcagaatc ttcagcttca tggatagaac caatgtgttg agtattcatc gcttgtcgat    60

-continued

```
tgataactga ccaacttgtc tttcgagttt gcgggagttg gactggaggg cccaaggtta    120
caggtttaag ggcttgtgca gctaaggttt tcatgatgaa gcagaacaat ctctggcaga    180
ttccaagaga ttgaagctgc t                                              201
```

<210> SEQ ID NO 10
<211> LENGTH: 201
<212> TYPE: DNA
<213> ORGANISM: Beta vulgaris

<400> SEQUENCE: 10

```
tttcagaatc ttcagcttca tggatagaac caatgtgttg agtattcatc gcttgtcgat     60
tgataactga ccaacttgtc tttcgagttt gcgggagttg tactggaggg cccaaggtta    120
caggtttaag ggcttgtgca gctaaggttt tcatgatgaa gcagaacaat ctctggcaga    180
ttccaagaga ttgaagctgc t                                              201
```

<210> SEQ ID NO 11
<211> LENGTH: 201
<212> TYPE: DNA
<213> ORGANISM: Beta vulgaris
<220> FEATURE:
<221> NAME/KEY: misc_feature
<222> LOCATION: (178)..(178)
<223> OTHER INFORMATION: n is a, c, g, or t

<400> SEQUENCE: 11

```
ccaacaactt rtttctccaa ctcttcctct tagcttccat atycatgcct tgtgccaaat     60
ccattaattt caactatcct gcagttttca actttggcga ctcgaattct gataccggtg    120
ctcttgtggc ttctggactc gaggggatya ctgatcccta cggacaract tacttcanaa    180
aaccatcagg aagatacagt g                                              201
```

<210> SEQ ID NO 12
<211> LENGTH: 201
<212> TYPE: DNA
<213> ORGANISM: Beta vulgaris
<220> FEATURE:
<221> NAME/KEY: misc_feature
<222> LOCATION: (178)..(178)
<223> OTHER INFORMATION: n is a, c, g, or t

<400> SEQUENCE: 12

```
ccaacaactt rtttctccaa ctcttcctct tagcttccat atycatgcct tgtgccaaat     60
ccattaattt caactatcct gcagttttca actttggcga ttcgaattct gataccggtg    120
ctcttgtggc ttctggactc gaggggatya ctgatcccta cggacaract tacttcanaa    180
aaccatcagg aagatacagt g                                              201
```

<210> SEQ ID NO 13
<211> LENGTH: 201
<212> TYPE: DNA
<213> ORGANISM: Beta vulgaris
<220> FEATURE:
<221> NAME/KEY: misc_feature
<222> LOCATION: (178)..(178)
<223> OTHER INFORMATION: n is a, c, g, or t

<400> SEQUENCE: 13

```
ccaacaactt rtttctccaa ctcttcctct tagcttccat atycatgcct tgtgccaaat     60
ccattaattt caactatcct gcagttttca actttggcga ttcgaattct gataccggtg    120
ctcttgtggc ttctggactc gaggggatya ctgatcccta cggacaract tacttcanaa    180
```
aaccatcagg aagatacagt g                                              201

<210> SEQ ID NO 14
<211> LENGTH: 201
<212> TYPE: DNA
<213> ORGANISM: Beta vulgaris

<400> SEQUENCE: 14
ttacttttgc caagaatata ctttgtttgc atggttcaac gtaaagttga ttggtgcgag      60
aartgttata ttttctggtk tgggccacca gaaacgyagc gcttttccac akwacactaa    120
atggatcctt tctggacctg gcaaaactag gttgtacacc caaataactc tatataggta   180
ggaatttact gtattccaaa t                                              201

<210> SEQ ID NO 15
<211> LENGTH: 201
<212> TYPE: DNA
<213> ORGANISM: Beta vulgaris
<220> FEATURE:
<221> NAME/KEY: misc_feature
<222> LOCATION: (103)..(103)
<223> OTHER INFORMATION: n is a, c, g, or t
<220> FEATURE:
<221> NAME/KEY: misc_feature
<222> LOCATION: (151)..(151)
<223> OTHER INFORMATION: n is a, c, g, or t

<400> SEQUENCE: 15
aacggttgga atttttctga agacattact gttttgtaat tgtccatgaa ggtgactagc     60
ttcgggaatg gtcattttag gtgcaagcga tgatcttgtt atntgagtgg tcaatcttga   120
tggaaagaaa tgcttaggga tggtgtttgt ntgctaagaa tggagaagaa accaataagc   180
taagatcagt tcatgtctcg t                                              201

<210> SEQ ID NO 16
<211> LENGTH: 201
<212> TYPE: DNA
<213> ORGANISM: Beta vulgaris
<220> FEATURE:
<221> NAME/KEY: misc_feature
<222> LOCATION: (103)..(103)
<223> OTHER INFORMATION: n is a, c, g, or t
<220> FEATURE:
<221> NAME/KEY: misc_feature
<222> LOCATION: (151)..(151)
<223> OTHER INFORMATION: n is a, c, g, or t

<400> SEQUENCE: 16
aacggttgga atttttctga agacattact gttttgtaat tgtccatgaa ggtgactagc     60
ttcgggaatg gtcattttag gtgcaagcga tgatcttgtt ctntgagtgg tcaatcttga   120
tggaaagaaa tgcttaggga tggtgtttgt ntgctaagaa tggagaagaa accaataagc   180
taagatcagt tcatgtctcg t                                              201

<210> SEQ ID NO 17
<211> LENGTH: 201
<212> TYPE: DNA
<213> ORGANISM: Beta vulgaris
<220> FEATURE:
<221> NAME/KEY: misc_feature
<222> LOCATION: (182)..(182)
<223> OTHER INFORMATION: n is a, c, g, or t

<400> SEQUENCE: 17

```
ctattagttt tgatgtgtca ttttatggtg ctgattttgt ttatggtatt cctgaacatg      60
ctactagtct tgcacttaag cctactagag gccccggtat cgaacattcg gaaccttata     120 ggcttttta  cttggatgtg tttgaatatc ttcatgagtc gcctttcggg ttgtatggat     180
cnattccgtt catgcttggt c                                               201
```

```
<210> SEQ ID NO 18
<211> LENGTH: 201
<212> TYPE: DNA
<213> ORGANISM: Beta vulgaris
<220> FEATURE:
<221> NAME/KEY: misc_feature
<222> LOCATION: (182)..(182)
<223> OTHER INFORMATION: n is a, c, g, or t

<400> SEQUENCE: 18
```

```
ctattagttt tgatgtgtca ttttatggtg ctgattttgt ttatggtatt cctgaacatg      60
ctactagtct tgcacttaag cctactagag gccccggtat tgaacattcg gaaccttata     120 ggcttttta  cttggatgtg tttgaatatc ttcatgagtc gcctttcggg ttgtatggat     180
cnattccgtt catgcttggt c                                               201
```

```
<210> SEQ ID NO 19
<211> LENGTH: 201
<212> TYPE: DNA
<213> ORGANISM: Beta vulgaris

<400> SEQUENCE: 19
```

```
tgcgccaaat tatcaacctg tggtgcatga acttatacat gaaaaaacaa aacgaactca      60
tacatgaaaa ccaaaagagg tggaccctaa atgtaataac aaacctggtg agtgagccac     120
atgagcaaga tatcaacagc agggaccaag acacttgaag aagcatcacc atcaacatcc     180
ccatcatctt gttggattac c                                               201
```

```
<210> SEQ ID NO 20
<211> LENGTH: 201
<212> TYPE: DNA
<213> ORGANISM: Beta vulgaris

<400> SEQUENCE: 20
```

```
tgcgccaaat tatcaacctg tggtgcatga acttatacat gaaaaaacaa aacgaactca      60
tacatgaaaa ccaaaagagg tggaccctaa atgtaataac taacctggtg agtgagccac     120
atgagcaaga tatcaacagc agggaccaag acacttgaag aagcatcacc atcaacatcc     180
ccatcatctt gttggattac c                                               201
```

```
<210> SEQ ID NO 21
<211> LENGTH: 201
<212> TYPE: DNA
<213> ORGANISM: Beta vulgaris

<400> SEQUENCE: 21
```

```
agaatgtgag gggaagaaac mgaagatgca ttgcatgaag aaggatgrag tataatagaa      60
ccccaatccc tctctccata cttggcctct ttcagtcttc tccttactaa caatcctccc     120
acatcttctt ttctcatctc agaaacactc ctcagtattg caaggcayaa taacagcacg     180
aaaacagcrt cttcttctgg c                                               201
```

```
<210> SEQ ID NO 22
<211> LENGTH: 201
```

```
<212> TYPE: DNA
<213> ORGANISM: Beta vulgaris

<400> SEQUENCE: 22
agaatgtgag gggaagaaac mgaagatgca ttgcatgaag aaggatgrag tataatagaa      60
ccccaatccc tctctccata cttggcctct ttcagtcttc gccttactaa caatcctccc     120
acatcttctt ttctcatctc agaaacactc ctcagtattg caaggcayaa taacagcacg     180
aaaacagcrt cttcttctgg c                                               201

<210> SEQ ID NO 23
<211> LENGTH: 201
<212> TYPE: DNA
<213> ORGANISM: Beta vulgaris

<400> SEQUENCE: 23
aaagaaatac tttgacatgg tggcgtaart attttcccgt gcttagactg ataaatccaa      60
catcaattct attatcatga aaagcaaat ttacctcttt ggatatttgc tgcagaatag      120
gtatgatctc agcgaagtca ggtctcattg caggatcttg ctgccagcat ctttcaagaa     180
gctcggtaag cttgggatga c                                               201

<210> SEQ ID NO 24
<211> LENGTH: 201
<212> TYPE: DNA
<213> ORGANISM: Beta vulgaris

<400> SEQUENCE: 24
aaagaaatac tttgacatgg tggcgtaart attttcccgt gcttagactg ataaatccaa      60
catcaattct attatcatga aaagcaaat ttacctcttt tgatatttgc tgcagaatag      120
gtatgatctc agcgaagtca ggtctcattg caggatcttg ctgccagcat ctttcaagaa     180
gctcggtaag cttgggatga c                                               201

<210> SEQ ID NO 25
<211> LENGTH: 201
<212> TYPE: DNA
<213> ORGANISM: Beta vulgaris

<400> SEQUENCE: 25
aagcagatcc ttaacttccc ttcttaactg acgcagtttt gagtcttaag aatgacaacc      60
ctatgctttc atttggatat tcaatgtcta ctgaagccac tactacaggc ttgattactg     120
ttaaatttgt accaaaatgg gtaaattaca gtttattgtt ctactgataa tgattttgt     180 aaacattcaa gtgctttgta t                                               201

<210> SEQ ID NO 26
<211> LENGTH: 201
<212> TYPE: DNA
<213> ORGANISM: Beta vulgaris

<400> SEQUENCE: 26
aagcagatcc ttaacttccc ttcttaactg acgcagtttt gagtcttaag aatgacaacc      60
ctatgctttc atttggatat tcaatgtcta ctgaagccac cactacaggc ttgattactg     120
ttaaatttgt accaaaatgg gtaaattaca gtttattgtt ctactgataa tgattttgt     180 aaacattcaa gtgctttgta t                                               201

<210> SEQ ID NO 27
```

```
<211> LENGTH: 201
<212> TYPE: DNA
<213> ORGANISM: Beta vulgaris

<400> SEQUENCE: 27
caaaagacta taagggtcaa gttgaagcaa acttgagagt ggtcctccac tggatcattt      60
gtctctattg tcttaatgca acaaacgact tgaaaccatc taaaaacaat agataggatg     120
attccactag aatcatcatt gcgaataagc aaccaaggat ctttattgtt taccacataa     180
acattcatat tgatcaccat g                                               201

<210> SEQ ID NO 28
<211> LENGTH: 201
<212> TYPE: DNA
<213> ORGANISM: Beta vulgaris

<400> SEQUENCE: 28
caaaagacta taagggtcaa gttgaagcaa acttgagagt ggtcctccac tggatcattt      60
gtctctattg tcttaatgca acaaacgact tgaaaccatc caaaaacaat agataggatg     120
attccactag aatcatcatt gcgaataagc aaccaaggat ctttattgtt taccacataa     180
acattcatat tgatcaccat g                                               201

<210> SEQ ID NO 29
<211> LENGTH: 201
<212> TYPE: DNA
<213> ORGANISM: Beta vulgaris

<400> SEQUENCE: 29
atatcattga aaaataata ttgaggaaat aaagttcaac ctgtttagca cctagaccaa       60
aggttgcatt gccagataga taaggtttcg agcgatcagc ggttttgcag agcatagaaa     120
gtgctgcagt agctcccact tgtatagcct gcatgtcctc caaaatggtg agaagctgaa     180
tagcttaaga ttcataattc t                                               201

<210> SEQ ID NO 30
<211> LENGTH: 201
<212> TYPE: DNA
<213> ORGANISM: Beta vulgaris

<400> SEQUENCE: 30
atatcattga aaaataata ttgaggaaat aaagttcaac ctgtttagca cctagaccaa       60
aggttgcatt gccagataga taaggtttcg agcgatcagc agttttgcag agcatagaaa     120
gtgctgcagt agctcccact tgtatagcct gcatgtcctc caaaatggtg agaagctgaa     180
tagcttaaga ttcataattc t                                               201

<210> SEQ ID NO 31
<211> LENGTH: 201
<212> TYPE: DNA
<213> ORGANISM: Beta vulgaris

<400> SEQUENCE: 31
aggtaatata taaaacagag gcaatctcac aataaaacag ttatcatggs gatcagattc      60
acaaacccgt aacagcaaca tgagggtcaa acagccacc agataaactt caaaaagccc     120
gacccgaccc caactactgg gcagcaacag ccaacttaaa gcttaccagc ccaagctacg    180
aycaatcaac atkgtaacat c                                              201
```

<210> SEQ ID NO 32
<211> LENGTH: 201
<212> TYPE: DNA
<213> ORGANISM: Beta vulgaris

<400> SEQUENCE: 32

```
aggtaatata taaaacagag gcaatctcac aataaaacag ttatcatggs gatcagattc    60
acaaacccgt aacagcaaca tgagggtcaa aacagccacc ggataaactt caaaaagccc   120
gacccgaccc caactactgg gcagcaacag ccaacttaaa gcttaccagc ccaagctacg   180
aycaatcaac atkgtaacat c                                             201
```

<210> SEQ ID NO 33
<211> LENGTH: 201
<212> TYPE: DNA
<213> ORGANISM: Beta vulgaris

<400> SEQUENCE: 33

```
gacaccacct aatcaaataa tgctttcttc attagtaggg aaccctatcc aagaacaaga    60
acttacctca agtgattttc gaggtgaggg gctacgagag attccagctt ccccacgcgg   120
agaaacygcc tgrggagaag ccaaacgatg aggaattggt gcwcgttcat craggccgyg   180
cttctctggg ctacgactcc t                                             201
```

<210> SEQ ID NO 34
<211> LENGTH: 201
<212> TYPE: DNA
<213> ORGANISM: Beta vulgaris

<400> SEQUENCE: 34

```
gacaccacct aatcaaataa tgctttcttc attagtaggg aaccctatcc aagaacaaga    60
acttacctca agtgattttc gaggtgaggg gctacgagag gttccagctt ccccacgcgg   120
agaaacygcc tgrggagaag ccaaacgatg aggaattggt gcwcgttcat craggccgyg   180
cttctctggg ctacgactcc t                                             201
```

<210> SEQ ID NO 35
<211> LENGTH: 201
<212> TYPE: DNA
<213> ORGANISM: Beta vulgaris

<400> SEQUENCE: 35

```
aagaattctt tgtgttaagg tggttgtgtg atgtatgttt gatagtagca aagattcctt    60
tgatatatgt agattaatat agtcaatttt tatctatcat ctgtagtagc actctcaagt   120
tcatctgata ttcgtgtaat aattctgaac gcttgaatgc attggttgtt tttgtttaga   180
cattaaactc ttttgttcag g                                             201
```

<210> SEQ ID NO 36
<211> LENGTH: 201
<212> TYPE: DNA
<213> ORGANISM: Beta vulgaris

<400> SEQUENCE: 36

```
aagaattctt tgtgttaagg tggttgtgtg atgtatgttt gatagtagca aagattcctt    60
tgatatatgt agattaatat agtcaattttt tatctatcat ttgtagtagc actctcaagt  120
tcatctgata ttcgtgtaat aattctgaac gcttgaatgc attggttgtt tttgtttaga   180
cattaaactc ttttgttcag g                                             201
```

```
<210> SEQ ID NO 37
<211> LENGTH: 201
<212> TYPE: DNA
<213> ORGANISM: Beta vulgaris

<400> SEQUENCE: 37
aacttatatt acatgagtga cattcatata ggtcacttac gcgaacatct ggtagattat      60
caatgcctaa atttgaagta tccttctcat attcaacagg tccacatgaa ttacttatag     120
ttgcaaggga aaggtccagc gtggagttgc catcctcaga attcacgcac atatgctgtt    180
agatagcagc atacaaatgt t                                               201

<210> SEQ ID NO 38
<211> LENGTH: 201
<212> TYPE: DNA
<213> ORGANISM: Beta vulgaris

<400> SEQUENCE: 38
aacttatatt acatgagtga cattcatata ggtcacttac gcgaacatct ggtagattat      60
caatgcctaa atttgaagta tccttctcat attcaacagg cccacatgaa ttacttatag     120
ttgcaaggga aaggtccagc gtggagttgc catcctcaga attcacgcac atatgctgtt    180
agatagcagc atacaaatgt t                                               201
```

PLANTS OF THE SPECIES *BETA VULGARIS* WITH RESISTANCE TO *CERCOSPORA*

CROSS-REFERENCE TO RELATED APPLICATION

This application is the United States national phase of International Application No. PCT/EP2021/064365 filed May 28, 2021, the disclosure of which is hereby incorporated by reference in its entirety.

The Sequence Listing associated with this application is filed in electronic format via Patent Center and is hereby incorporated by reference into the specification in its entirety. The name of the text file containing the Sequence Listing is 2307809_ST25.txt. The size of the text file is 15,557 bytes, and the text file was created on Oct. 18, 2023.

BACKGROUND OF THE INVENTION

Field of the Invention

The present invention relates to *Beta vulgaris* plants resistant to *Cercospora*. The present invention further relates to methods for identifying *Cercospora* resistant *Beta vulgaris* plants, methods for providing *Cercospora* resistant *Beta vulgaris* plants and means for identifying *Cercospora* resistant *Beta vulgaris* plants.

Description of Related Art

*Beta vulgaris* plants belong to the subfamily Betoideae of the family Amaranthaceae. Other members of this family are the species *Beta corolliflora, Beta lomatogona, Beta macrocarpa, Beta macrorhiza, Beta nana*, and *Beta trigyna*. A plant of the species *Beta vulgaris* is, in particular, a plant of the subspecies *Beta vulgaris* subsp. vulgaris. This subspecies comprises several cultivar groups, such as beetroot (*Beta vulgaris* ssp. vulgaris var. conditiva; alternatively referred to as *Beta vulgaris* ssp. vulgaris var. rubra), also known as garden beet, red beet or table beet), grown as a root vegetable; sugar beet (*Beta vulgaris* ssp. vulgaris var. altissima), cultivated for the production of sugar; stalky chard, or Swiss chard (*Beta vulgaris* subsp. vulgaris var. flavescens), and leafy spinach beet (*Beta vulgaris* subsp. vulgaris var. cicla), grown for their leaves; and mangelwurzel (*Beta vulgaris* ssp. vulgaris var. crassa), which is also known as fodder beet, or mangold wurzel, and is a fodder crop. Genomically encoded traits, such as disease resistance, in any of these cultivar groups can be introduced into another cultivar via human action using methods known to a person skilled in the art.

Cultivated *Beta vulgaris* plants are grown worldwide, generally in regions with temperate climates. The plant prefers relatively cool temperatures between 15 and 24° C. Globally, Europe, especially France and Germany, the United States of America and Russia are the largest producers of beets. However, beet cultivars are also grown in many other countries in Europe, Asia, Africa and South America.

*Cercospora* Leaf Spot (CLS), caused by the ascomycete fungus *Cercospora beticola*, is considered one of the most economically damaging diseases that affect plants of the species *Beta vulgaris* due to its worldwide prevalence and destructiveness. Damage to the plant foliage caused by this disease can, for sugarbeets, decrease yield up to 50% and, for beetroots, reduce marketability and interfere with mechanized harvesting.

*Cercospora* leaf spot occurs globally in regions where beets are cultivated, resulting in significant damage specially in warm temperate areas, including southern Europe, the Mediterranean region, Japan, Russia, USA and South and Central America.

Infection occurs rapidly at temperatures 25-35° C., in particular when night temperatures are above 16° C. and the relative humidity is above >90%, and is further promoted by rainy weather and leaf irrigation.

The infection starts when a spore lands on a leaf and, with its germ tubes, penetrates the leaf through stomata. The germ tube then develops into hyphae that grow intercellularly inside the leaf. The hyphae produce toxins, such as cercosporin and beticolin, and other enzymes that damage and kill nearby plant cells. This necrosis causes the appearance of round, millimeter-size, brown spots (3-5 mm) on leaves, the first visible sign of infection. As the disease progresses, these brown spots grow and merge until the leave itself turns yellow and dies. *Cercospora* can defoliate an entire plant requiring it to grow new leaves, which costs energy that cannot be directed to the beet.

*Cercospora* spreads by forming specialized hyphae (conidiophores) that emerge from the leaf and form asexual spores called conidia. These conidia are disseminated by wind or rain. Under suitable conditions, these conidia can germinate and repeat the cycle of infection. *Cercospora* leaf spot is a polycyclic disease characterized by repeated cycles of conidia germination, infection, sporulation, conidia release and re-infection. Under favorable conditions, one cycle of infection and re-infection can be completed within ten days leading to multiple infection cycles during the growing season and rapid spread of the infection to adjacent leaves and plants.

Outside growing seasons, *Cercospora* can survive on plant debris as conidia (for 1-4 months) and pseudostromata, where it can persist for 1-2 years. Alternatively, the fungus can infect weed species related to beets (e.g., lamb's quarters and pigweed) as well as other vegetable crops (chard, spinach).

Measures to manage *cercospora* leaf spot mainly include fungicidal treatments and crop rotation. However, limiting the use of fungicidal measures is highly desired as they affect the environment and are expensive. Moreover, chemical control with fungicides has become increasingly difficult due to the spread of various strains of *Cercospora* that are resistant to important chemical classes of fungicides. More efficient and sustainable disease management, therefore, requires the development of varieties with genetic resistance.

Currently, all commercial beetroot varieties are susceptible to *cercospora* leaf spot despite *Cercospora*-tolerant varieties of sugar beet being on the market for decades. All of these tolerant varieties contain the same resistance originating from *Beta vulgaris* spp. *maritima*, which has a number of drawbacks:

The resistance is quantitative and based on an unknown number of QTLs leading to complicated inheritance patterns. Previous publications identified at least four or five causative QTLs on chromosomes 2, 3, 4, 6 and 9 of the beet genome. Each of these QTLs only had a small contribution to resistance (less than 5%).

The resistance is linked to reduced agronomic performance in sugar beet. One or several of the resistance genes may be flanked by a gene or genes coding for poor agronomic performances. This is called linkage drag. Alternatively, the large number of QTLs limits effective inbreeding of *Cercospora*-resistant parent lines resulting in reduced hybrid vigour.

The resistance is not sufficient to protect the crop against *cercospora* leaf spot. Fungicide applications are nevertheless still needed.

Recently, a novel *Cercospora*-resistance gene in plants of the species *Beta vulgaris*, in particular sugarbeets, was described (EP3696188). The advantage of this new resistance is that it is based on a single gene, and, in sugar beet, it does not have a negative effect on agronomic performance. Yet, the resistance provided by this gene is limited and additional fungicide treatment or further genetic resistance is still required to protect the crop against *cercospora* leaf spot.

Hence, to generate beet varieties with improved resistance against *cercospora* leaf spot, there is a need to identify new, preferably augmented, genomically encoded resistances, which on their own provide a strong resistance effect without reducing agronomic performance. These resistances can then be stacked to generate beet varieties, especially commercial hybrid beetroot varieties, with strong and durable resistance against *Cercospora beticola.*

SUMMARY OF THE INVENTION

Considering the above, it is an object of the present invention, amongst others, to provide novel genomically encoded resistances to *Cercospora beticola* and plants comprising these resistances. The present invention especially has the object, amongst other objects, to provide a beetroot plant resistant to *Cercospora beticola.*

The present invention meets the above object, amongst other objects, as outlined in the appended claims.

Specifically, this object, amongst other objects, is achieved by providing *Cercospora*-resistant *Beta vulgaris* plants comprising a genomic fragment located on chromosome 4, wherein said genomic fragment comprises at least one sequence from the group consisting of SEQ ID No. 1. SEQ ID No. 3. SEQ ID No. 5, SEQ ID No. 7, SEQ ID No. 9, SEQ ID No. 11, SEQ ID No. 13, and SEQ ID No. 15.

DESCRIPTION OF THE INVENTION

The term "at least one" can be used interchangeably with the term "one or more". As such, the term "at least one" should be understood to mean at least one, two, three, four, five, six, or more, or all. Preferably, the resistance providing genomic fragment on chromosome 4 comprises SEQ ID No. 5; more preferably SEQ ID No. 5, and SEQ ID No. 7; more preferably SEQ ID No. 3, SEQ ID No. 5, and SEQ ID No. 7; more preferably SEQ ID No. 1. SEQ ID No. 3. SEQ ID No. 5, SEQ ID No. 7, and SEQ ID No. 9; and most preferably SEQ ID No. 1. SEQ ID No. 3. SEQ ID No. 5, SEQ ID No. 7, SEQ ID No. 9, SEQ ID No. 11, SEQ ID No. 13, and SEQ ID No. 15. The resistance providing genomic fragment is not comprised of SEQ ID No. 2. SEQ ID No. 4, SEQ ID No. 6, SEQ, ID No. 8, SEQ ID No. 10, SEQ ID No. 12, SEQ ID No. 14, and SEQ ID No. 16. Said resistance providing genomic fragment on chromosome 4 may further comprise at least one sequence from the group consisting of SEQ ID No. 17, SEQ ID No. 19, and SEQ ID No. 21.

Alternatively, this object, amongst other objects, is achieved by providing *Cercospora*-resistant *Beta vulgaris* plants comprising a combination of two resistance providing genomic fragments, wherein a first genomic fragment is located on chromosome 4 and comprises at least one sequence from the group consisting of SEQ ID No. 1. SEQ ID No. 3, SEQ ID No. 5, SEQ ID No. 7, SEQ ID No. 9. SEQ ID No. 11, SEQ ID No. 13, and SEQ ID No. 15, and wherein, a second genomic fragment is located on chromosome 9 and comprises at least one sequence from the group consisting of SEQ ID No. 23, SEQ ID No. 25, SEQ ID No. 27, SEQ ID No. 29, SEQ ID No. 31, SEQ ID No. 33, SEQ ID No. 35, and SEQ ID No. 37. Preferably, said first genomic fragment on chromosome 4 comprises SEQ ID No. 5; more preferably SEQ ID No. 5, and SEQ ID No. 7; more preferably SEQ ID No. 3, SEQ ID No. 5, and SEQ ID No. 7; more preferably SEQ ID No. 1. SEQ ID No. 3. SEQ ID No. 5, SEQ ID No. 7, and SEQ ID No. 9; and most preferably SEQ ID No. 1. SEQ ID No. 3, SEQ ID No. 5, SEQ ID No. 7, SEQ ID No. 9, SEQ ID No. 11, SEQ ID No. 13, and SEQ ID No. 15. Preferably, said second resistance providing genomic fragment on chromosome 9 comprises SEQ ID No. 35; more preferably SEQ ID No. 35, and SEQ ID No. 37; more preferably SEQ ID No. 33, SEQ ID No. 35, and SEQ ID No. 37; more preferably SEQ ID No. 29, SEQ ID No. 31, SEQ ID No. 33, SEQ ID No. 35, and SEQ ID No. 37; and most preferably SEQ ID No. 23, SEQ ID No. 25, SEQ ID No. 27, SEQ ID No. 29, SEQ ID No. 31, SEQ ID No. 33, SEQ ID No. 35, and SEQ ID No. 37. The first resistance providing genomic fragment is not comprised of SEQ ID No. 2, SEQ ID No. 4, SEQ ID No. 6, SEQ, ID No. 8, SEQ ID No. 10, SEQ ID No. 12, SEQ ID No. 14, and SEQ ID No. 16, and the second resistance providing genomic fragment is not comprised of SEQ ID No. 24, SEQ ID No. 26, SEQ ID No. 28, SEQ ID No. 30, SEQ ID No. 32, SEQ ID No. 34, SEQ ID No. 36, and SEQ ID No. 38. Hence, in one preferred embodiment, the *Cercospora*-resistant *Beta vulgaris* plant comprises SEQ ID No. 5, and SEQ ID No. 35; more preferably SEQ ID No. 1. SEQ ID No. 3. SEQ ID No. 5. SEQ ID No. 7, SEQ ID No. 9. SEQ ID No. 29, SEQ ID No. 31, SEQ ID No. 33, SEQ ID No. 35, and SEQ ID No. 37; and most preferably SEQ ID No. 1. SEQ ID No. 3. SEQ ID No. 5, SEQ ID No. 7, SEQ ID No. 9, SEQ ID No. 11, SEQ ID No. 13, SEQ ID No. 15, SEQ ID No. 23, SEQ ID No. 25, SEQ ID No. 27, SEQ ID No. 29, SEQ ID No. 31, SEQ ID No. 33, SEQ ID No. 35, and SEQ ID No. 37.

The resistance according to the invention can be introduced in a plant cell by transformation (e.g., using *Agrobacterium tumefaciens*). Genomic fragments can be amplified by long-range PCR amplifications, de novo synthesized, or isolated from gels or columns (e.g., after restriction digestion). The resulting fragments can be reassembled (e.g., in yeast) or introduced in an expression vector, subsequently transformed into *Beta vulgaris* cells and allowed to integrate or recombine with the *Beta vulgaris* genome. The fragment may be introduced in a single step or in a series of transformations ultimately resulting in a *Beta vulgaris* plant comprising the resistance of the present invention.

According to a preferred embodiment of the present invention, the resistance providing genomic fragments are obtainable, obtained, or are from a *Beta vulgaris* plant deposited at NCIMB (National Collections of Industrial, Food and Marine Bacteria; NCIMB Limited, Ferguson Building; Craibstone Estate, Bucksburn Aberdeen, Scotland, AB21 9YA United Kingdom) on 7 May 2021 under number NCIMB 43769.

According to a preferred embodiment, the present *Beta vulgaris* plants are cytoplasmic male sterile (CMS).

According to yet another preferred embodiment, the present *Beta vulgaris* plants are hybrid plants. The present invention also relates to hybrid *Beta vulgaris* plants obtainable either by crossing *Cercospora*-susceptible *Beta vulgaris* plants with *Beta vulgaris* plants comprising the resistance to *Cercospora beticola* or by crossing a *Cercospora*-susceptible *Beta vulgaris* plant with deposit number NCIMB 43769.

Within the context of the present invention the following *Beta vulgaris* plants are contemplated: *Beta vulgaris* ssp. vulgaris var. conditiva (beetroot, red beet), *Beta vulgaris* ssp. vulgaris var. altissima (sugar beet), *Beta vulgaris* subsp. vulgaris var. flavescens (chard, Swiss chard), *Beta vulgaris* subsp. vulgaris var. cicla (spinach beet), and *Beta vulgaris* ssp. vulgaris var. crassa (mangelwurzel).

The present invention further relates to methods for identifying the genomically encoded resistance against the plant pathogen *Cercospora beticola* as found in the *Beta vulgaris* plant deposited under deposit number NCIMB 43769. The method comprises the step of identifying one genomic fragment on chromosome 4 by detecting at least one genomic sequence from the group consisting of SEQ ID No. 1. SEQ ID No. 3, SEQ ID No. 5, SEQ ID No. 7, SEQ ID No. 9, SEQ ID No. 11, SEQ ID No. 13, SEQ ID No. 15, SEQ ID No. 17, SEQ ID No. 19, and SEQ ID No. 21. Preferably the method further comprises identifying a further resistance providing genomic fragment on chromosome 9 by detecting at least one genomic sequence from the group consisting of SEQ ID No. 23, SEQ ID No. 25, SEQ ID No. 27, SEQ ID No. 29, SEQ ID No. 31, SEQ ID No. 33, SEQ ID No. 35, and SEQ ID No. 37. Several common genotyping methods exist for detecting a single nuclear polymorphism (SNP) in a genomic sequence, including PCR-based methods, direct hybridization, fragment analysis, and sequencing. An example of a method suitable for detecting a genomic sequence is isolating DNA from available plant material (e.g., from a piece of a leaf from a plant, or a seed), followed by nucleic acid amplification of isolated DNA (e.g., using PCR), and detecting the presence of said genomic sequence (e.g., by sequencing, measuring fluorescence, or visualizing and analyzing PCR amplification using agarose gel electrophoresis).

The present invention accordingly provides a method of producing a *Beta vulgaris* plant of the invention comprising the steps of obtaining plant material from a plant of the species *Beta vulgaris*, subjecting said plant material to mutagenesis to create mutagenized plant material, analyzing said mutagenized plant material to identify a plant having resistance to *Cercospora beticola*. Said plant material is preferably a seed.

Suitable mutagenesis methods comprise chemical mutagenesis (e.g., using ethyl methanesulfonate (EMS), N-methyl-N-nitrosourea (MNU), N-ethyl-N-nitrosourea (ENU), sodium azide (NaN3), methylnitrosoguanidine (MNNG), diethyl sulfonate (DES), TILLING, or mutagenesis by generating reactive oxygen species) and radiation mutagenesis (e.g., using UV radiation or ion beam radiation). Mutagenesis can lead to one or more mutations located in the coding sequence (mRNA, cDNA or genomic sequence) or in the associated non-coding sequence and/or regulatory sequence regulating the level of expression of the coding sequence. The presence of one or more mutations (e.g., insertion, inversion, deletion and/or replacement of one or more nucleotide(s)) may lead to the encoded protein having a new or altered functionality (gain of function), reduced functionality (reduced function) or no functionality (loss-of-function), e.g., due to the protein being truncated or having an amino acid sequence wherein one or more amino acids are deleted, inserted or replaced. Such changes may lead to the protein having a different 3D structure or conformation, being targeted to a different sub-cellular compartment, having one or more modified catalytic domains, having a modified binding activity to nucleic acids or proteins, etc.

The present invention further relates to seeds capable of providing the present plants. Seeds can be coated, colored, washed, polished, encrusted, pelleted, primed or undergo a combination of treatments. Coated seeds are covered by a relatively thin layer of polymer supplied to the seed; to this polymer fungicides or insecticides can be added to protect the seed against soil borne pathogens and insect damage. Additionally, a dye can be added. This added color gives the farmer the opportunity to check for correct drilling of the seeds. Alternatively, also other beneficial compounds can be added as micronutrients or beneficial micro-organisms promoting the growth of the young seedlings. Encrusted seeds are not only covered by a polymer with or without extra substances, as described above, but the seeds are provided with a smooth surface as well. This makes drilling easier and the added weight enables a more precise direct drilling of the seeds. Polishing removes the outermost layer of the seed, so that the seed assumes a more rounded form. Polishing and washing promotes germination of the seed. With pelleting the seeds are covered with more material, e.g., polymer bound clay, to produce a regularly shaped, round pellet. This pellet, besides having protecting substances described above, can be constructed in such a way that it will melt or split after water uptake. Priming or pre-germination is a treatment in which seeds are given enough moisture to initiate germination of the embryo inside the seed. This results in a faster emergence of the seedling, a higher emergence rate and better growth. It is believed that priming leads to a better root system and faster growth.

In addition to the *Beta vulgaris* plant according to the invention, the present invention also relates to a seed, a plant cell, a protoplast, a plant organ, plant tissue, edible parts, pollen, microspores, ovaries, ovules, egg cells, callus, suspension culture, somatic embryos, embryos or plant parts of the *Beta vulgaris* plants defined above comprising a *Cercospora beticola* resistance providing genomic fragment. Plant parts include, but are not limited to, the shoot, the stalk, the stem, leaves, blossoms, inflorescence, roots, fruits, and cuttings.

The present invention furthermore relates to molecular markers which markers co-segregate with a genomically encoded resistance against the plant pathogen *Cercospora beticola* as present in deposit number NCIMB 43769, which molecular markers are selected from the group consisting of SEQ ID No. 1. SEQ ID No. 3, SEQ ID No. 5, SEQ ID No. 7, SEQ ID No. 9. SEQ ID No. 11, SEQ ID No. 13, SEQ ID No. 15, SEQ ID No. 17, SEQ ID No. 19, SEQ ID No. 21, SEQ ID No. 23, SEQ ID No. 25, SEQ ID No. 27, SEQ ID No. 29, SEQ ID No. 31, SEQ ID No. 33, SEQ ID No. 35, and SEQ ID No. 37.

The present invention will be further detailed in the following examples.

EXAMPLES

Example 1. Mutagenesis of *Beta vulgaris* Plants with the Purpose of Making a Library to Screen for *Cercospora* Resistance Random mutagenesis followed by forward screening can be a useful method for identifying mutant *Beta vulgaris* plants with resistance to *Cercospora beticola*. A mutagenized library can be generated by subjecting seeds to a step of mutagenesis, preferably random mutagenesis. Such a step may comprise, but is not limited to, the treatment of a pool of 100.000 to 200.000 seeds with a chemical mutagen, or a mixture of chemical mutagens, e.g., 0.25% EMS for 16 hours at room temperature; alternatively, radiation can be used (e.g., gamma-radiation from a radioactive Cobalt-60 source). Preferably, only a mildly mutagenized library (fewer than 1% of all genes contain a mutation in a coding region) is generated. Nevertheless, the mutagenesis step will lead to the loss of germination in some seeds. In contrast to irradiation, which can lead to mutations varying from single base substitutions or deletions to large deletions, EMS produces predominantly random point mutations by nucleotide substitution; particularly by guanine alkylation.

The mutagenized seeds can be sown and propagated in a field using standard practices. The mutagenized seed will generate plants that each have a particular set of mutations. Plants can be harvested in pools and viable seeds can be sown again (F1 population). To obtain an F1S1 population seeds can be collected from the F1 plants after selfing. As the mutations will segregate in an F1S1 population, the resistance in this population can be evaluated and used to map the resistance against *Cercospora beticola*.

Example 2. Field Tests for Assessing Resistance Against *Cercospora beticola*

The inoculum of *Cercospora beticola* was prepared by growing the fungus in Potato Dextrose Agar for 3 weeks incubated under near-UV light (12 hours day/12 hours night) at 25° C. Spores and mycelium were scraped with water, filtered and the concentration adjusted to $10^5$ colony forming units per ml.

Plants were sown directly in the field in mid-June in the Netherlands, and, after germination, thinned to a 5 cm distance between plants. As susceptible control varieties Wodan F1 and Pablo F1 were used. Seven-week-old plants were inoculated by spraying the spore suspension on the leaves using an ultra-low volume or droplet sprayer, preferably during rainy weather or in the evening when dew will be formed during the night (as the fungus requires a long wet leaf period for infection). The inoculation was performed once a week, until a visibly high disease pressure was achieved (usually 8-12 consecutive weeks required, until mid-September to mid-October).

The assessment of disease resistance was performed visually by the amount and density of the typical small, round to oval-shaped spots on leaves, using a classification scale from 0 (completely susceptible, severe symptoms) to 9 (highly resistant, no symptoms). A score on this classification scale is referred to as a disease score.

Example 3. Results of Assessment of Resistance Against *Cercospora beticola*

TABLE 1

Disease score of different genotypes and varieties

| | Disease Score *Cercospora beticola* inoculation test in NL |
|---|---|
| Susceptible varieties (namely Wodan and Pablo) | 1-2 |
| Plants comprising CB4.1 | 4 |
| Plants comprising CB4.1 + CB9.1 | 5 |

Example 4. Development of Markers to Detect *Cercospora* Resistance in *Beta vulgaris*

A segregating F1S1 mapping population was developed to map the resistance against *Cercospora beticola*. This population was made by crossing a resistant *Beta vulgaris* plant with a susceptible *Beta vulgaris* plant, after which the resulting F1 plant was self-pollinated. To perform a QTL mapping, 520 individual plants were tested in a *Cercospora beticola* disease field trial and leaf material of these plants was used for DNA isolation, genotyping and marker analysis.

To genotype the mapping population, informative genome-wide markers were developed. Using 399 SNP markers covering the entire genome a genetic map was constructed and QTL analysis performed. Two QTL peaks were found. One QTL peak was located on chromosome 4 at base pair 45501459 of the EL10.1 public sugar beet reference genome (EL10_1.0, GenBank assembly accession GCA_002917755.1), and one on chromosome 9 at base pair 24213487 of the EL10.1 reference genome. The QTLs were named CB4.1 and CB9.1.

To narrow down the required haplotype size, a fine mapping experiment was performed. After pre-selection on 3720 plants, phenotypic assessment for the level of resistance was performed on 962 plants in a *Cercospora beticola* field disease trial. The results showed that CB4.1 is essential for resistance, and that CB9.1 is needed to obtain the highest level of resistance as combining the two QTL peaks gives the highest average disease score. SNPs for detecting the genomically encoded resistances against *Cercospora beticola* can be found in Table 2 to 4. Abbreviations are according to IUPAC nucleotide code.

Seeds of the F1S1 population comprising CB4.1 and CB9.1 were deposited at the NCIMB (NCIMB Limited, Ferguson Building; Craibstone Estate, Bucksburn ABERDEEN, Scotland, AB21 9YA, United Kingdom) on 7 May 2021 under deposit number NCIMB 43769.

| Symbol | Nucleotide Base |
|---|---|
| A | Adenine |
| C | Cytosine |
| G | Guanine |
| T | Thymine |
| N | A or C or G or T |
| M | A of C |
| R | A or G |
| W | A or T |
| S | C or G |
| Y | C or T |
| K | Gor T |
| V | Not T |
| H | Not G |
| D | Not C |
| B | Not A |

TABLE 2

SNPs for the detection of the resistance against *Cercospora beticola*, QTL CB 4.1

| SNP | Chromosome (EL10.1) | Position Chromosome (bp) (EL10.1) | Allele linked to resistance | Alternative allele |
|---|---|---|---|---|
| 1 | 4 | 44276365 | A | G |
| 2 | 4 | 44440329 | T | A |
| 3 | 4 | 45501459 | T | C |
| 4 | 4 | 47197127 | T | G |
| 5 | 4 | 47371424 | G | T |
| 6 | 4 | 47419640 | C | T |
| 7 | 4 | 48257283 | A | G |
| 8 | 4 | 48338565 | A | C |
| 9 | 4 | 52795726 | C | T |
| 10 | 4 | 55593004 | A | T |
| 11 | 4 | 55597074 | T | G |

TABLE 3

SNPs for the detection of the resistance against *Cercospora beticola*, QTL CB9.1

| SNP | Chromosome (EL10.1) | Position Chromosome (bp) (EL10.1) | Allele linked to resistance | Alternative allele |
|---|---|---|---|---|
| 12 | 9 | 21546628 | G | T |
| 13 | 9 | 21859451 | T | C |
| 14 | 9 | 22691063 | T | C |
| 15 | 9 | 23659048 | G | A |
| 16 | 9 | 24117497 | A | G |
| 17 | 9 | 24118744 | A | G |
| 18 | 9 | 24213487 | C | T |
| 19 | 9 | 24369620 | T | C |

TABLE 4

Sequences for the detection of the resistance against *Cercospora beticola*

| SEQ ID No. | SNP | SNP position in EL10.1 | Sequence |
|---|---|---|---|
| 1 | 1 | Chr4_44276365 | ACACARGGGACGAAAAGCAGAACAKGACACCAAC ACARTAGCAATAACGACACAACAAGAGCAGCAAC ATAACAACAATTCAATGACCCACTAACAATAA[A]C CACCACAMCTCCTTTTAGCTAAACTCACAATCACT AATCAATCTGCTAATTCAAATCTTGAARTGAAATA AAATCYATTTCTRAGTAAACTCAGCAAAC |
| 2 | 1 | Chr4_44276365 | ACACARGGGACGAAAAGCAGAACAKGACACCAAC ACARTAGCAATAACGACACAACAAGAGCAGCAAC ATAACAACAATTCAATGACCCACTAACAATAA[G]C CACCACAMCTCCTTTTAGCTAAACTCACAATCACT AATCAATCTGCTAATTCAAATCTTGAARTGAAATA AAATCYATTTCTRAGTAAACTCAGCAAAC |
| 3 | 2 | Chr4_44440329 | TACTCAAGCACGTAAATGGTTCAACGAAATGGTTC TGGATGGCTGTTCCCCTAATGTGGTGACCTACACTG CCCTAATTCATGCATACCTTAAAGTACGC[T]GGATA GGTGAAGCCAATGAACTTTTTGAGATTATGTTGAA AGATGGATGCAAACCGAATGTTGTGACTTATACTG CTTTAATTGATGGTTATTGTAAATC |
| 4 | 2 | Chr4_44440329 | TACTCAAGCACGTAAATGGTTCAACGAAATGGTTC TGGATGGCTGTTCCCCTAATGTGGTGACCTACACTG CCCTAATTCATGCATACCTTAAAGTACGC[A]GGAT AGGTGAAGCCAATGAACTTTTTGAGATTATGTTGA AAGATGGATGCAAACCGAATGTTGTGACTTATACT GCTTTAATTGATGGTTATTGTAAATC |
| 5 | 3 | Chr4_45501459 | GAGCTGATCCGGTTTGTTTCAAACCATAAGCCTATT GTTGCTGCTATGAGGGTGTCTGAGAGAACTGTCAT GATTATCAAGAACCTAGTATCGTCTTCGG[T]GCCAT CTCTGGTATGGTAGTATTGACATATAGAAAATGCC AATTTTTCAGTTCTTGGTCATATTCACTTAAGGACA GTATGCTTGTACAGTCTTCTCTAT |
| 6 | 3 | Chr4_45501459 | GAGCTGATCCGGTTTGTTTCAAACCATAAGCCTATT GTTGCTGCTATGAGGGTGTCTGAGAGAACTGTCAT GATTATCAAGAACCTAGTATCGTCTTCGG[C]GCCAT CTCTGGTATGGTAGTATTGACATATAGAAAATGCC |

TABLE 4-continued

Sequences for the detection of the resistance against *Cercospora beticola*

| SEQ ID No. | SNP | SNP position in EL10.1 | Sequence |
|---|---|---|---|
| | | | AATTTTTCAGTTCTTGGTCATATTCACTTAAGGACA GTATGCTTGTACAGTCTTCTCTAT |
| 7 | 4 | Chr4_47197127 | CAAAGTAAGAAGTCAGAAAATTTATATTCCTAGCC TCTCTTCCTCACCCCTTTTCCTGTATGTTGTGTGAGC TTTGATTAGTTTTAACGAATATAATTCT[T]TCGCTG CAAACCTGCAAGTGTGTATATACTCCATTTTGTATA TATATGAAATCATGGAGTATTGCAGTGAGGAATCT TTGTAAGACTTTCTCTGAGAATG |
| 8 | 4 | Chr4_47197127 | CAAAGTAAGAAGTCAGAAAATTTATATTCCTAGCC TCTCTTCCTCACCCCTTTTCCTGTATGTTGTGTGAGC TTTGATTAGTTTTAACGAATATAATTCT[G]TCGCTG CAAACCTGCAAGTGTGTATATACTCCATTTTGTATA TATATGAAATCATGGAGTATTGCAGTGAGGAATCT TTGTAAGACTTTCTCTGAGAATG |
| 9 | 5 | Chr4_47371424 | TTTCAGAATCTTCAGCTTCATGGATAGAACCAATGT GTTGAGTATTCATCGCTTGTCGATTGATAACTGACC AACTTGTCTTTCGAGTTTGCGGGAGTTG[G]ACTGGA GGGCCCAAGGTTACAGGTTTAAGGGCTTGTGCAGC TAAGGTTTTCATGATGAAGCAGAACAATCTCTGGC AGATTCCAAGAGATTGAAGCTGCT |
| 10 | 5 | Chr4_47371424 | TTTCAGAATCTTCAGCTTCATGGATAGAACCAATGT GTTGAGTATTCATCGCTTGTCGATTGATAACTGACC AACTTGTCTTTCGAGTTTGCGGGAGTTG[T]ACTGGA GGGCCCAAGGTTACAGGTTTAAGGGCTTGTGCAGC TAAGGTTTTCATGATGAAGCAGAACAATCTCTGGC AGATTCCAAGAGATTGAAGCTGCT |
| 11 | 6 | Chr4_47419640 | CCAACAACTTRTTTCTCCAACTCTTCCTCTTAGCTTC CATATYCATGCCTTGTGCCAAATCCATTAATTTCAA CTATCCTGCAGTTTTCAACTTTGGCGA[C]TCGAATT CTGATACCGGTGCTCTTGTGGCTTCTGGACTCGAGG GGATYACTGATCCCTACGGACARACTTACTTCANA AAACCATCAGGAAGATACAGTG |
| 12 | 6 | Chr4_47419640 | CCAACAACTTRTTTCTCCAACTCTTCCTCTTAGCTTC CATATYCATGCCTTGTGCCAAATCCATTAATTTCAA CTATCCTGCAGTTTTCAACTTTGGCGA[T]TCGAATT CTGATACCGGTGCTCTTGTGGCTTCTGGACTCGAGG GGATYACTGATCCCTACGGACARACTTACTTCANA AAACCATCAGGAAGATACAGTG |
| 13 | 7 | Chr4_48257283 | TTACTTTTGCCAAGAATATACTTTGTTTGCATGGTT CAACGTAAAGTTGATTGGTGCGAGAARTGTTATAT TTTCTGGTKTGGGCCACCAGAAACGYAGC[A]CTTTT CCACAKWACACTAAATGGATCCTTTCTGGACCTGG CAAAACTAGGTTGTACACCCAAATAACTCTATATA GGTAGGAATTTACTGTATTCCAAAT |
| 14 | 7 | Chr4_48257283 | TTACTTTTGCCAAGAATATACTTTGTTTGCATGGTT CAACGTAAAGTTGATTGGTGCGAGAARTGTTATAT TTTCTGGTKTGGGCCACCAGAAACGYAGC[G]CTTT TCCACAKWACACTAAATGGATCCTTTCTGGACCTG GCAAAACTAGGTTGTACACCCAAATAACTCTATAT AGGTAGGAATTTACTGTATTCCAAAT |
| 15 | 8 | Chr4_48338565 | AACGGTTGGAATTTTTCTGAAGACATTACTGTTTTG TAATTGTCCATGAAGGTGACTAGCTTCGGGAATGG TCATTTTAGGTGCAAGCGATGATCTTGTT[A]TNTGA GTGGTCAATCTTGATGGAAAGAAATGCTTAGGGAT GGTGTTTGTNTGCTAAGAATGGAGAAGAAACCAAT AAGCTAAGATCAGTTCATGTCTCGT |
| 16 | 8 | Chr4_48338565 | AACGGTTGGAATTTTTCTGAAGACATTACTGTTTTG TAATTGTCCATGAAGGTGACTAGCTTCGGGAATGG TCATTTTAGGTGCAAGCGATGATCTTGTT[C]TNTGA GTGGTCAATCTTGATGGAAAGAAATGCTTAGGGAT GGTGTTTGTNTGCTAAGAATGGAGAAGAAACCAAT AAGCTAAGATCAGTTCATGTCTCGT |

TABLE 4-continued

Sequences for the detection of the resistance against *Cercospora beticola*

| SEQ ID No. | SNP | SNP position in EL10.1 | Sequence |
|---|---|---|---|
| 17 | 9 | Chr4_52795726 | CTATTAGTTTTGATGTGTCATTTTATGGTGCTGATTT TGTTTATGGTATTCCTGAACATGCTACTAGTCTTGC ACTTAAGCCTACTAGAGGCCCCGGTAT[C]GAACAT TCGGAACCTTATAGGCTTTTTAACTTGGATGTGTTT GAATATCTTCATGAGTCGCCTTTCGGGTTGTATGGA TCNATTCCGTTCATGCTTGGTC |
| 18 | 9 | Chr4_52795726 | CTATTAGTTTTGATGTGTCATTTTATGGTGCTGATTT TGTTTATGGTATTCCTGAACATGCTACTAGTCTTGC ACTTAAGCCTACTAGAGGCCCCGGTAT[T]GAACAT TCGGAACCTTATAGGCTTTTTAACTTGGATGTGTTT GAATATCTTCATGAGTCGCCTTTCGGGTTGTATGGA TCNATTCCGTTCATGCTTGGTC |
| 19 | 10 | Chr4_55593004 | TGCGCCAAATTATCAACCTGTGGTGCATGAACTTAT ACATGAAAAAACAAAACGAACTCATACATGAAAA CCAAAAGAGGTGGACCCTAAATGTAATAAC[A]AAC CTGGTGAGTGAGCCACATGAGCAAGATATCAACAG CAGGGACCAAGACACTTGAAGAAGCATCACCATCA ACATCCCCATCATCTTGTTGGATTACC |
| 20 | 10 | Chr4_55593004 | TGCGCCAAATTATCAACCTGTGGTGCATGAACTTAT ACATGAAAAAACAAAACGAACTCATACATGAAAA CCAAAAGAGGTGGACCCTAAATGTAATAAC[T]AAC CTGGTGAGTGAGCCACATGAGCAAGATATCAACAG CAGGGACCAAGACACTTGAAGAAGCATCACCATCA ACATCCCCATCATCTTGTTGGATTACC |
| 21 | 11 | Chr4_55597074 | AGAATGTGAGGGGAAGAAACMGAAGATGCATTGC ATGAAGAAGGATGRAGTATAATAGAACCCCAATCC CTCTCTCCATACTTGGCCTCTTTCAGTCTTC[T]CCTT ACTAACAATCCTCCCACATCTTCTTTTCTCATCTCA GAAACACTCCTCAGTATTGCAAGGCAYAATAACAG CACGAAAaCAGCRTCTTCTTCTGGC |
| 22 | 11 | Chr4_55597074 | AGAATGTGAGGGGAAGAAACMGAAGATGCATTGC ATGAAGAAGGATGRAGTATAATAGAACCCCAATCC CTCTCTCCATACTTGGCCTCTTTCAGTCTTC[G]CCTT ACTAACAATCCTCCCACATCTTCTTTTCTCATCTCA GAAACACTCCTCAGTATTGCAAGGCAYAATAACAG CACGAAAaCAGCRTCTTCTTCTGGC |
| 23 | 12 | Chr9_21546628 | AAAGAAATACTTTGACATGGTGGCGTAARTATTTTC CCGTGCTTAGACTGATAAATCCAACATCAATTCTAT TATCATGAAAAAGCAAATTTACCTCTTT[G]GATATT TGCTGCAGAATAGGTATGATCTCAGCGAAGTCAGG TCTCATTGCAGGATCTTGCTGCCAGCATCTTTCAAG AAGCTCGGTAAGCTTGGGATGAC |
| 24 | 12 | Chr9_21546628 | AAAGAAATACTTTGACATGGTGGCGTAARTATTTTC CCGTGCTTAGACTGATAAATCCAACATCAATTCTAT TATCATGAAAAAGCAAATTTACCTCTTT[T]GATATT TGCTGCAGAATAGGTATGATCTCAGCGAAGTCAGG TCTCATTGCAGGATCTTGCTGCCAGCATCTTTCAAG AAGCTCGGTAAGCTTGGGATGAC |
| 25 | 13 | Chr9_21859451 | AAGCAGATCCTTAACTTCCCTTCTTAACTGACGCAG TTTTGAGTCTTAAGAATGACAACCCTATGCTTTCAT TTGGATATTCAATGTCTACTGAAGCCAC[T]ACTACA GGCTTGATTACTGTTAAATTTGTACCAAAATGGGTA AATTACAGTTTATTGTTCTACTGATAATGATTTTTG TAAACATTCAAGTGCTTTGTAT |
| 26 | 13 | Chr9_21859451 | AAGCAGATCCTTAACTTCCCTTCTTAACTGACGCAG TTTTGAGTCTTAAGAATGACAACCCTATGCTTTCAT TTGGATATTCAATGTCTACTGAAGCCAC[C]ACTACA GGCTTGATTACTGTTAAATTTGTACCAAAATGGGTA AATTACAGTTTATTGTTCTACTGATAATGATTTTTG TAAACATTCAAGTGCTTTGTAT |
| 27 | 14 | Chr9_22691063 | CAAAAGACTATAAGGGTCAAGTTGAAGCAAACTTG AGAGTGGTCCTCCACTGGATCATTTGTCTCTATTGT CTTAATGCAACAAACGACTTGAAACCATC[T]AAAA |

TABLE 4-continued

Sequences for the detection of the resistance against *Cercospora beticola*

| SEQ ID No. | SNP | SNP position in EL10.1 | Sequence |
|---|---|---|---|
| | | | ACAATAGATAGGATGATTCCACTAGAATCATCATT GCGAATAAGCAACCAAGGATCTTTATTGTTTACCA CATAAACATTCATATTGATCACCATG |
| 28 | 14 | Chr9_22691063 | CAAAAGACTATAAGGGTCAAGTTGAAGCAAACTTG AGAGTGGTCCTCCACTGGATCATTTGTCTCTATTGT CTTAATGCAACAAACGACTTGAAACCATC[C]AAAA ACAATAGATAGGATGATTCCACTAGAATCATCATT GCGAATAAGCAACCAAGGATCTTTATTGTTTACCA CATAAACATTCATATTGATCACCATG |
| 29 | 15 | Chr9_23659048 | ATATCATTGAAAAAATAATATTGAGGAAATAAAGT TCAACCTGTTTAGCACCTAGACCAAAGGTTGCATTG CCAGATAGATAAGGTTTCGAGCGATCAGC[G]GTTT TGCAGAGCATAGAAAGTGCTGCAGTAGCTCCCACT TGTATAGCCTGCATGTCCTCCAAAATGGTGAGAAG CTGAATAGCTTAAGATTCATAATTCT |
| 30 | 15 | Chr9_23659048 | ATATCATTGAAAAAATAATATTGAGGAAATAAAGT TCAACCTGTTTAGCACCTAGACCAAAGGTTGCATTG CCAGATAGATAAGGTTTCGAGCGATCAGC[A]GTTT TGCAGAGCATAGAAAGTGCTGCAGTAGCTCCCACT TGTATAGCCTGCATGTCCTCCAAAATGGTGAGAAG CTGAATAGCTTAAGATTCATAATTCT |
| 31 | 16 | Chr9_24117497 | AGGTAATATATAAAACAGAGGCAATCTCACAATAA AACAGTTATCATGGSGATCAGATTCACAAACCCGT AACAGCAACATGAGGGTCAAAACAGCCACC[A]GAT AAACTTCAAAAAGCCCGACCCGACCCCAACTACTG GGCAGCAACAGCCAACTTAAAGCTTACCAGCCCAA GCTACGAYCAATCAACATKGTAACATC |
| 32 | 16 | Chr9_24117497 | AGGTAATATATAAAACAGAGGCAATCTCACAATAA AACAGTTATCATGGSGATCAGATTCACAAACCCGT AACAGCAACATGAGGGTCAAAACAGCCACC[G]GA TAAACTTCAAAAAGCCCGACCCGACCCCAACTACT GGGCAGCAACAGCCAACTTAAAGCTTACCAGCCCA AGCTACGAYCAATCAACATKGTAACATC |
| 33 | 17 | Chr9_24118744 | GACACCACCTAATCAAATAATGCTTTCTTCATTAGT AGGGAACCCTATCCAAGAACAAGAACTTACCTCAA GTGATTTTCGAGGTGAGGGGCTACGAGAG[A]TTCC AGCTTCCCCACGCGGAGAAACYGCCTGRGGAGAAG CCAAACGATGAGGAATTGGTGCWCGTTCATCRAGG CCGYGCTTCTCTGGGCTACGACTCCT |
| 34 | 17 | Chr9_24118744 | GACACCACCTAATCAAATAATGCTTTCTTCATTAGT AGGGAACCCTATCCAAGAACAAGAACTTACCTCAA GTGATTTTCGAGGTGAGGGGCTACGAGAG[G]TTCC AGCTTCCCCACGCGGAGAAACYGCCTGRGGAGAAG CCAAACGATGAGGAATTGGTGCWCGTTCATCRAGG CCGYGCTTCTCTGGGCTACGACTCCT |
| 35 | 18 | Chr9_24213487 | AAGAATTCTTTGTGTTAAGGTGGTTGTGTGATGTAT GTTTGATAGTAGCAAAGATTCCTTTGATATATGTAG ATTAATATAGTCAATTTTTATCTATCAT[C]TGTAGT AGCACTCTCAAGTTCATCTGATATTCGTGTAATAAT TCTGAACGCTTGAATGCATTGGTTGTTTTTGTTTAG ACATTAAACTCTTTTGTTCAGG |
| 36 | 18 | Chr9_24213487 | AAGAATTCTTTGTGTTAAGGTGGTTGTGTGATGTAT GTTTGATAGTAGCAAAGATTCCTTTGATATATGTAG ATTAATATAGTCAATTTTTATCTATCAT[T]TGTAGT AGCACTCTCAAGTTCATCTGATATTCGTGTAATAAT TCTGAACGCTTGAATGCATTGGTTGTTTTTGTTTAG ACATTAAACTCTTTTGTTCAGG |
| 37 | 19 | Chr9_24369620 | AACTTATATTACATGAGTGACATTCATATAGGTCAC TTACGCGAACATCTGGTAGATTATCAATGCCTAAAT TTGAAGTATCCTTCTCATATTCAACAGG[T]CCACAT GAATTACTTATAGTTGCAAGGGAAAGGTCCAGCGT GGAGTTGCCATCCTCAGAATTCACGCACATATGCT GTTAGATAGCAGCATACAAATGTT |

TABLE 4-continued

Sequences for the detection of the resistance against Cercospora beticola

| SEQ ID No. | SNP | SNP position in EL10.1 | Sequence |
|---|---|---|---|
| 38 | 19 | Chr9_24369620 | AACTTATATTACATGAGTGACATTCATATAGGTCAC TTACGCGAACATCTGGTAGATTATCAATGCCTAAAT TTGAAGTATCCTTCTCATATTCAACAGG[C]CCACAT GAATTACTTATAGTTGCAAGGGAAAGGTCCAGCGT GGAGTTGCCATCCTCAGAATTCACGCACATATGCT GTTAGATAGCAGCATACAAATGTT |

The invention claimed is:

1. A non-naturally occurring *Cercospora*-resistant hybrid *Beta vulgaris* plant comprising a first *Cercospora* resistance providing genomic fragment on chromosome 4 of said hybrid *Beta vulgaris* plant, wherein said first *Cercospora* resistance providing genomic fragment comprises at least one genomic sequence selected from the group consisting of SEQ ID NOs: 1, 3, 5, 7, 9 and 11, wherein said first *Cercospora* resistance genomic fragment on said chromosome 4 corresponds to positions 44276365 bp to 55597074 bp of QTL CB4.1; wherein said hybrid *Beta vulgaris* plant comprises a second *Cercospora* resistance providing genomic fragment on chromosome 9 of said hybrid *Beta vulgaris* plant, wherein said second *Cercospora* resistance providing genomic fragment comprises at least one genomic sequence selected from the group consisting of SEQ ID NOs: 13, 15, 17 and 19 wherein said second *Cercospora* resistance genomic fragment on said chromosome 9 corresponds to positions 21546628 bp to 24369620 bp of QTL CB9.1, and wherein representative seed of said hybrid *Beta vulgaris* plant having been deposited under accession number NCIMB 43769.

2. The non-naturally occurring *Cercospora*-resistant hybrid *Beta vulgaris* plant according to claim 1, wherein said plant is cytoplasmic male sterile (CMS).

3. A method for producing a non-naturally occurring *Cercospora*-resistant hybrid *Beta vulgaris* plant comprising steps of:
    (a) obtaining a *Cercospora* susceptible *Beta vulgaris* plant;
    (b) crossing said *Cercospora* susceptible *Beta vulgaris* plant to a resistant *Beta vulgaris* plant to produce F1 *Beta vulgaris* plant comprising QTLs CB4.1 and CB9.1;
    (c) selfing said F1 *Beta vulgaris* plant to create a segregating F1S1 mapping population to map the resistance against *Cercospora beticola*;
    (d) analyzing said segregating F1S1 mapping population to identify (i) a first *Cercospora* resistance genomic fragment on chromosome 4 by detecting at least one genomic sequence selected from the group consisting of SEQ ID NOs: 1, 3, 5, 7, 9 and 11, wherein said first *Cercospora* resistance genomic fragment on said chromosome 4 corresponds to positions 44276365 bp to 55597074 bp of said QTL CB4.1 and (ii) a second *Cercospora* resistance genomic fragment on chromosome 9 by detecting at least one genomic sequence selected from the group consisting of SEQ ID NOs: 13, 15, 17 and 19, wherein said second *Cercospora* resistance genomic fragment on said chromosome 9 corresponds to positions 21546628 bp to 24369620 bp of QTL CB9.1; and
    (e) obtaining the non-naturally occurring *Cercospora*-resistant hybrid *Beta vulgaris* plant from step (d), wherein representative seed of said hybrid *Beta vulgaris* plant having been deposited under accession number NCIMB 43769.

4. A hybrid seed or a hybrid plant part thereof of said non-naturally occurring *Cercospora*-resistant *Beta vulgaris* hybrid plant according to claim 1, wherein said hybrid seed and said hybrid plant part thereof, comprises said genomic fragment on said chromosome 4 and said genomic fragment on chromosome 9.

5. The hybrid seed according to claim 4 wherein said hybrid seed is polished, coated, encrusted, pelleted, or primed.

* * * * *